B. F. RICE.

NAIL-PLATE FEEDER.

No. 6,970. Reissued Feb. 29, 1876.

Witnesses;
H. P. Kennick
H. E. Metcalf

Inventor;
Benjamin F. Rice
Per C. C. Shaw
Atty.

N. PETERS, PHOTO-LITHOGRAPHER, WASHINGTON, D. C.

UNITED STATES PATENT OFFICE.

BENJAMIN F. RICE, OF WEYMOUTH, MASSACHUSETTS.

IMPROVEMENT IN NAIL-PLATE FEEDERS.

Specification forming part of Letters Patent No. 157,295, dated December 1, 1874; reissue No. 6,970, dated February 29, 1876; application filed January 31, 1876.

*To all whom it may concern:*

Be it known that I, BENJAMIN F. RICE, of Weymouth, in the county of Norfolk, State of Massachusetts, have invented a certain new and useful Improvement in Nail-Machines, of which the following is a description sufficiently full, clear, and exact to enable any person skilled in the art or science to which my invention appertains to make and use the same, reference being had to the accompanying drawing, forming a part of this specification, in which—

Figure 1:
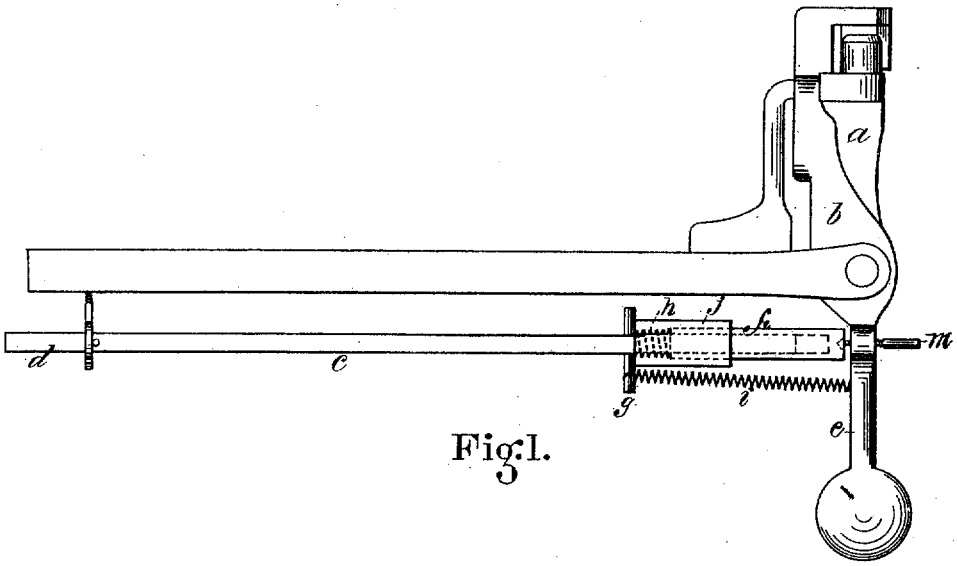
Figure 2:
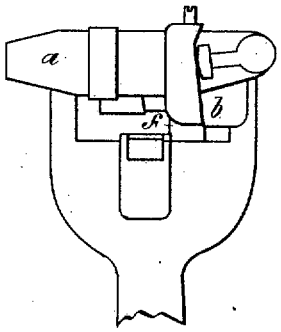
Figure 4:
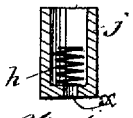
Figure 3:
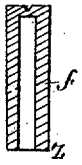

Figure 1 is a side elevation. Fig. 2 is a top view or plan of the fork-levers or tongs; Fig. 3, a vertical longitudinal section of the auxiliary rod; and Fig. 4 is a vertical longitudinal section of the thimble, and a view of the spring.

Like letters of reference indicate corresponding parts in the different figures of the drawing.

My invention relates especially to the feed mechanism of the machine; and consists in a novel construction and arrangement of the parts, as hereinafter more fully set forth and claimed, by which a more effective device of this character is produced than is now in ordinary use.

In the use of the feed mechanism shown in Letters Patent No. 120,190, granted to John C. Gould October 24, 1871, and of feeding devices of a like nature, much difficulty has been experienced in holding the nipper-rod with sufficient firmness at all parts of the operation to insure uniformity of size in the nails cut, and in preventing a waste of stock. It has been found that the spring of the push-up rod, when constructed and arranged as shown and described in Gould's patent, is liable to bend laterally and "cramp," and also to vibrate or "jump," producing a constantly-varying and uncertain pressure as the machine is worked, and consequently bad results.

To obviate these difficulties and objections I have found it necessary, in the construction of the push-up rod, to introduce another instrumentality or third element, consisting of what I term an "auxiliary rod." This rod preferably rests directly against an arm of the tongs of the feed, or its adjusting-screw, and is forced against the same to close the tongs on the plate by means of a main rod and a spring, so combined and arranged that the spring will yield properly when the gripe of the tongs on the nipper-rod is exerted to the fullest extent.

By this means I am enabled to employ a shorter and more powerful spring, and to avoid the bad results incident to ordinary feeding devices of this character, as described.

The nature and operation of my invention will be readily obvious to all conversant with such matters from the following description.

In the drawing, *a b* are the fork-levers or tongs, which do not require to be particularly described. The push-up rod is composed of three essential parts—the main rod *c*, spring *h*, and auxiliary rod *f*. The main rod is slightly smaller than the auxiliary rod, and is provided, near its upper end, with the step *g*, which also acts as a stay-pin, to which one end of the ordinary retracting-spring *i* is attached, the other end being secured to the arm *e* of the tongs. The rod *f* is bored out or drilled longitudinally to form a socket, in which the upper end of the rod *c* works loosely, the end opposite the bore being centrally countersunk or indented to receive the point of the adjusting-screw *m*. A thimble, *j*, rests upon the step *g*, in the top of which thimble there is a central opening, *x*, through which the rod *c* passes, the opposite end of the thimble receiving one end of the rod *f*. Within the thimble, and arranged around the rod *c*, there is a short, stout spring, *h*, one end pressing against the end *z* of the rod *f*, and the other against the inner side of the top of the thimble. This spring, it will be observed, acts expansively, and is not directly connected with the arm *e*.

In the use of my improvement, when the feeder is in action or vibrated, the end *d* of the rod *c* abuts against any convenient fixed object or part of the machine, forcing the rod *f*, by means of the rod *c* and spring *h*, against the arm *e* or its screw *m* with a firm but yielding pressure, thereby causing the fork-levers or tongs to properly hold and assist in feeding the nipper-rod and nail-plate.

The object of the thimble *j* is to cover and protect the spring *h*; but it will be obvious that it does not form an indispensable feature of my invention, which, having thus explained, what I claim is—

1. In a feeding mechanism substantially such as described, a push-up rod composed of a rod acting directly in connection with the arm *e* or its adjusting-screw, a rod for abutting against a stop or fixed part of the machine, and a spring arranged to operate, in combination with said rods, in such a manner as to exert a yielding pressure on said arm as the feeding mechanism is worked, substantially as set forth and specified.

2. In a feeding mechanism substantially such as described, the thimble *j*, in combination with the rods *e f* and spring *h*, as and for the purpose set forth and specified.

BENJAMIN F. RICE. [L. S.]

Witnesses:

C. A. SHAW,

JOHN S. PORTER.